(12) United States Patent
Dhaka et al.

(10) Patent No.: US 12,078,105 B2
(45) Date of Patent: *Sep. 3, 2024

(54) SYSTEM AND METHOD FOR PROVIDING COOLING IN A COMPRESSOR SECTION OF A GAS TURBINE ENGINE

(71) Applicant: General Electric Company, Schenectady, NY (US)

(72) Inventors: Pankaj Dhaka, Bengaluru (IN); Kudum Shinde, Bengaluru (IN); Paul Mathew, Bengaluru (IN); Gautam Naik, Bengaluru (IN); Vidyashankar Ramasastry Buravalla, Bengaluru (IN)

(73) Assignee: General Electric Company, Cincinnati, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/081,217

(22) Filed: Dec. 14, 2022

(65) Prior Publication Data
US 2023/0399979 A1    Dec. 14, 2023

(30) Foreign Application Priority Data
Jun. 14, 2022    (IN) .............................. 202211033993

(51) Int. Cl.
*F02C 7/18*     (2006.01)

(52) U.S. Cl.
CPC .......... *F02C 7/18* (2013.01); *F05D 2260/232* (2013.01)

(58) Field of Classification Search
CPC ............................. F02C 7/18; F05D 2260/232
See application file for complete search history.

(56) References Cited

U.S. PATENT DOCUMENTS

| | | | |
|---|---|---|---|
| 6,758,477 B2 | 7/2004 | Brauer et al. | |
| 8,884,480 B2 | 11/2014 | Pal et al. | |
| 9,671,172 B2 | 6/2017 | Pal et al. | |
| 10,415,707 B2 | 9/2019 | Bidkar et al. | |
| 10,781,754 B2 * | 9/2020 | Chiasson | F02C 7/26 |
| 10,823,184 B2 | 11/2020 | Sen et al. | |

(Continued)

OTHER PUBLICATIONS

Schierning et al., Concepts for Medium-High to High Temperature Thermoelectric Heat-to-Electricity Conversion: A Review of Selected Materials and Basic Considerations of Module Design, Translational Materials Research, vol. 2, No. 2, 2015, 27 Pages. https://iopscience.iop.org/article/10.1088/2053-1613/2/2/025001.

*Primary Examiner* — J. Todd Newton
(74) *Attorney, Agent, or Firm* — Dority & Manning, P.A.

(57) ABSTRACT

A method for cooling a compressor section of a gas turbine engine includes sensing, via at least one first temperature sensor, a first temperature at the first location on a stationary assembly of the compressor section. The method also includes sensing, via at least one second temperature sensor, a second temperature at a second location on the stationary assembly of the compressor section. The second location is spaced apart from the first location. The method also includes determining, via a controller, a delta between the first temperature and the second temperature. Further, the method includes operating, via the controller, at least one cooling element when the delta exceeds a predetermined threshold, the at least one cooling element provided at the first location of the stationary assembly of the compressor section.

18 Claims, 8 Drawing Sheets

(56) References Cited

U.S. PATENT DOCUMENTS

| | | | |
|---|---|---|---|
| 10,895,324 B2 | 1/2021 | Tran et al. | |
| 10,900,361 B2 | 1/2021 | Marsh et al. | |
| 10,900,570 B2 | 1/2021 | Bidkar et al. | |
| 11,035,251 B2 | 6/2021 | Shinde et al. | |
| 11,268,446 B2 | 3/2022 | Garrett, III et al. | |
| 11,603,773 B2* | 3/2023 | Black | F01D 21/12 |
| 2008/0310949 A1* | 12/2008 | Kondo | F01D 25/08 |
| | | | 415/47 |
| 2014/0314568 A1* | 10/2014 | Vetters | F01D 11/24 |
| | | | 416/1 |
| 2014/0373553 A1* | 12/2014 | Zaccaria | F02C 7/277 |
| | | | 60/778 |
| 2018/0034350 A1* | 2/2018 | Shinde | F01D 25/24 |
| 2019/0162203 A1* | 5/2019 | Shinde | F02C 7/18 |
| 2019/0345835 A1* | 11/2019 | Terwilliger | F01D 25/10 |
| 2019/0345836 A1* | 11/2019 | Terwilliger | F01D 11/24 |
| 2021/0003033 A1* | 1/2021 | Ellis | F01D 25/145 |
| 2023/0129383 A1* | 4/2023 | Schafer | F02C 9/18 |
| | | | 415/1 |
| 2023/0141059 A1* | 5/2023 | Minas | F01D 25/34 |
| | | | 60/646 |
| 2023/0323835 A1* | 10/2023 | Kumar | F02C 6/08 |
| | | | 415/177 |

* cited by examiner

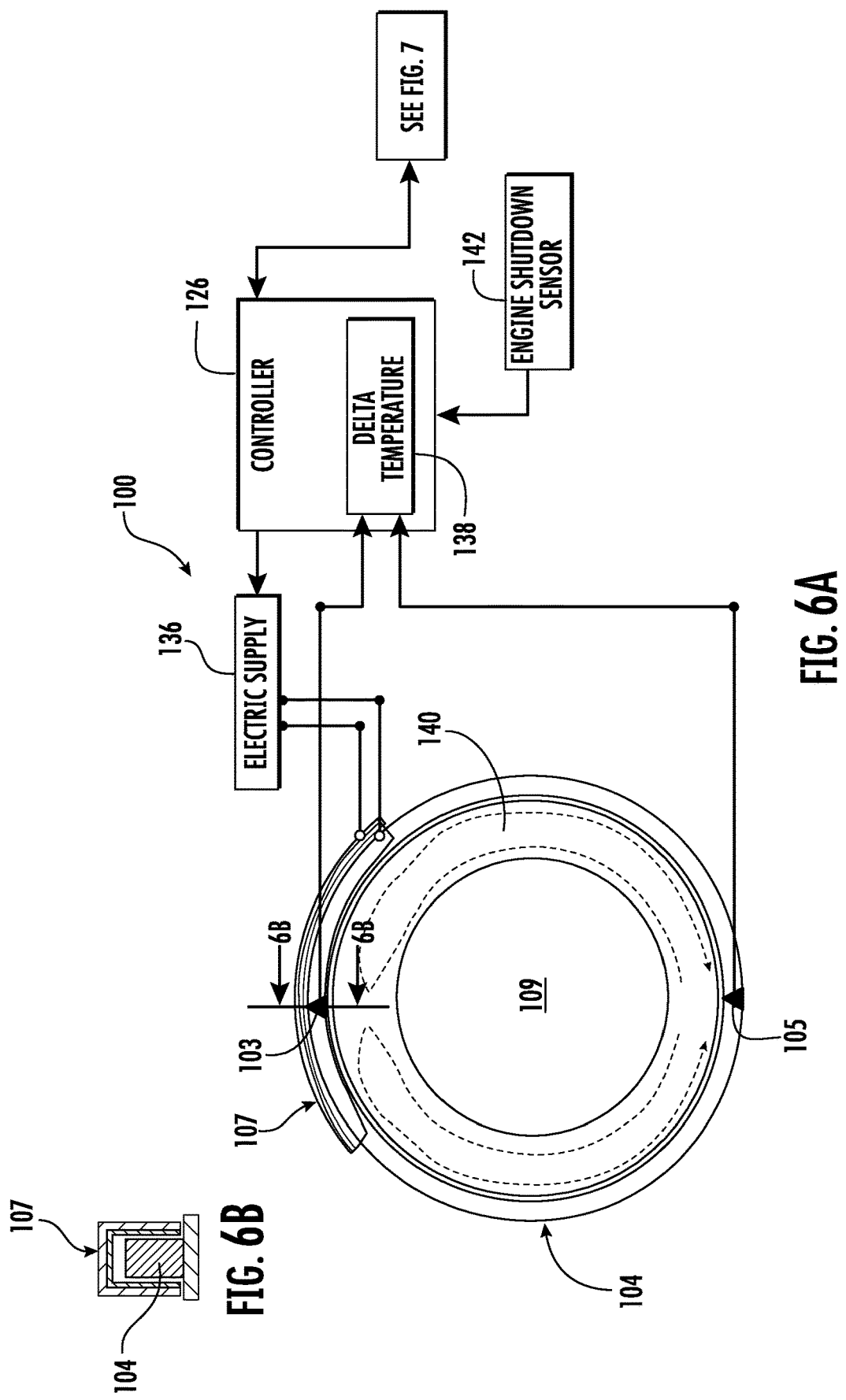

SYSTEM AND METHOD FOR PROVIDING COOLING IN A COMPRESSOR SECTION OF A GAS TURBINE ENGINE

PRIORITY INFORMATION

The present application claims priority to Indian Patent Application Number 202211033993 filed on Jun. 14, 2022.

FIELD

The present disclosure relates to gas turbine engines and, more particularly, to systems and methods for providing cooling in a high pressure compressor of a gas turbine engine.

BACKGROUND

Gas turbine engines generally include a turbine section downstream of a combustion section that is rotatable with a compressor section to rotate and operate the gas turbine engine to generate power, such as propulsive thrust. Further, gas turbine engines typically include multiple compressor stages to compress incoming airflow for delivery to the combustion section. Typically, the compressor section defines a high pressure compressor in serial flow arrangement with low pressure compressor. Further, the turbine section generally defines a high pressure turbine in serial flow arrangement with an intermediate pressure turbine and/or low pressure turbine. The high pressure turbine includes an inlet or nozzle guide vane between the combustion section and the high pressure turbine rotor. Conventionally, combustion gases exiting the combustion section define a relatively low velocity compared to a velocity (e.g., along a circumferential or tangential direction) of the first rotating stage of the turbine, generally defined as the high pressure turbine rotor. Thus, the nozzle guide vane serves to accelerate a flow of combustion gases exiting the combustion section to more closely match or exceed the high pressure turbine rotor speed along a tangential or circumferential direction. Such acceleration of flow using a nozzle guide vane to match or exceed high pressure turbine rotor speed is known to improve general engine operability and performance.

Thereafter, conventional turbine sections generally include successive rows or stages of stationary and rotating airfoils, or vanes and blades, respectively. Such configurations generally condition a flow of the combustion gases entering and exiting each stage of vanes and blades.

BRIEF DESCRIPTION OF THE DRAWINGS

A full and enabling disclosure of the present disclosure, including the best mode thereof, directed to one of ordinary skill in the art, is set forth in the specification, which makes reference to the appended figures, in which:

FIG. 6A is a system for providing cooling in a compressor section of a gas turbine engine such as shown in FIG. 2 according to the present disclosure;

FIG. 6B is a cross-sectional view of a stationary assembly of a system for providing cooling such as shown in FIG. 6A according to the present disclosure, particularly illustrating a cooling element arranged atop the stationary assembly;

DETAILED DESCRIPTION

Figure 1:
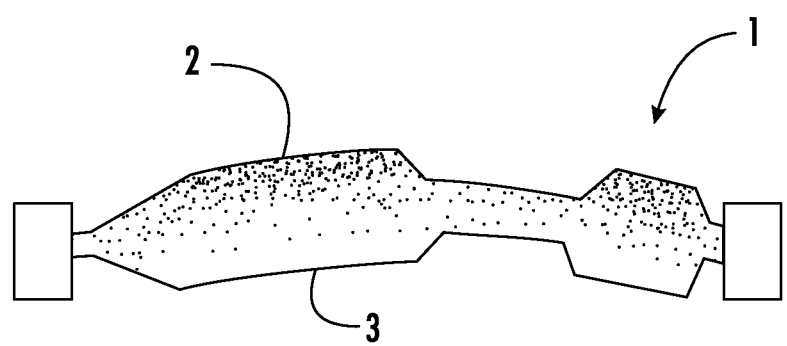
FIG. 1 is a schematic diagram of an embodiment of a rotating assembly, such as a rotor, of a gas turbine engine experiencing a bowing effect according to conventional construction.

Reference will now be made in detail to present embodiments of the disclosure, one or more examples of which are illustrated in the accompanying drawings. The detailed description uses numerical and letter designations to refer to features in the drawings. Like or similar designations in the drawings and description have been used to refer to like or similar parts of the disclosure.

The word "exemplary" is used herein to mean "serving as an example, instance, or illustration." Any implementation described herein as "exemplary" is not necessarily to be construed as preferred or advantageous over other implementations. Additionally, unless specifically identified otherwise, all embodiments described herein should be considered exemplary.

The singular forms "a", "an", and "the" include plural references unless the context clearly dictates otherwise.

The term "at least one of" in the context of, e.g., "at least one of A, B, and C" refers to only A, only B, only C, or any combination of A, B, and C.

The term "turbomachine" refers to a machine including one or more compressors, a heat generating section (e.g., a combustion section), and one or more turbines that together generate a torque output.

The term "gas turbine engine" refers to an engine having a turbomachine as all or a portion of its power source. Example gas turbine engines include turbofan engines, turboprop engines, turbojet engines, turboshaft engines, etc., as well as hybrid-electric versions of one or more of these engines.

The term "combustion section" refers to any heat addition system for a turbomachine. For example, the term combustion section may refer to a section including one or more of a deflagrative combustion assembly, a rotating detonation combustion assembly, a pulse detonation combustion assembly, or other appropriate heat addition assembly. In certain example embodiments, the combustion section may include an annular combustor, a can combustor, a cannular combustor, a trapped vortex combustor (TVC), or other appropriate combustion system, or combinations thereof.

The terms "low" and "high", or their respective comparative degrees (e.g., -er, where applicable), when used with a compressor, a turbine, a shaft, or spool components, etc. each refer to relative speeds within an engine unless otherwise specified. For example, a "low turbine" or "low speed turbine" defines a component configured to operate at a rotational speed, such as a maximum allowable rotational speed, lower than a "high turbine" or "high speed turbine" of the engine.

The terms "forward" and "aft" refer to relative positions within a gas turbine engine or vehicle, and refer to the normal operational attitude of the gas turbine engine or vehicle. For example, with regard to a gas turbine engine, forward refers to a position closer to an engine inlet and aft refers to a position closer to an engine nozzle or exhaust.

The terms "upstream" and "downstream" refer to the relative direction with respect to fluid flow in a fluid pathway. For example, "upstream" refers to the direction from which the fluid flows, and "downstream" refers to the direction to which the fluid flows.

As used herein, the terms "axial" and "axially" refer to directions and orientations that extend substantially parallel to a centerline of the gas turbine engine. Moreover, the terms "radial" and "radially" refer to directions and orientations that extend substantially perpendicular to the centerline of the gas turbine engine. In addition, as used herein, the terms "circumferential" and "circumferentially" refer to directions and orientations that extend arcuately about the centerline of the gas turbine engine.

The terms "coupled", "fixed", "attached to", and the like refer to both direct coupling, fixing, or attaching, as well as indirect coupling, fixing, or attaching through one or more intermediate components or features, unless otherwise specified herein.

As used herein, the terms "first", "second", "third" and so on may be used interchangeably to distinguish one component from another and are not intended to signify location or importance of the individual components.

The term "adjacent" as used herein with reference to two walls and/or surfaces refers to the two walls and/or surfaces contacting one another, or the two walls and/or surfaces being separated only by one or more nonstructural layers and the two walls and/or surfaces and the one or more nonstructural layers being in a serial contact relationship (i.e., a first wall/surface contacting the one or more nonstructural layers, and the one or more nonstructural layers contacting the a second wall/surface).

Approximating language, as used herein throughout the specification and claims, is applied to modify any quantitative representation that could permissibly vary without resulting in a change in the basic function to which it is related. Accordingly, a value modified by a term or terms, such as "about", "approximately", and "substantially", are not to be limited to the precise value specified. In at least some instances, the approximating language may correspond to the precision of an instrument for measuring the value, or the precision of the methods or machines for constructing or manufacturing the components and/or systems. For example, the approximating language may refer to being within a 1, 2, 4, 10, 15, or 20 percent margin. These approximating margins may apply to a single value, either or both endpoints defining numerical ranges, and/or the margin for ranges between endpoints.

Here and throughout the specification and claims, range limitations are combined and interchanged, such ranges are identified and include all the sub-ranges contained therein unless context or language indicates otherwise. For example, all ranges disclosed herein are inclusive of the endpoints, and the endpoints are independently combinable with each other.

During various stages of operation of gas turbine engines, the rotor blades and compressor casing are exposed to a range of temperatures, such as ground operation, takeoff, and cruise. Thus, such exposure results in thermal expansion or contraction of these compressor components. In particular, upon shut down of the gas turbine engine, uneven cooling of the rotor in the high pressure compressor can result in the upper portion of the shaft being longer than the lower portion, thereby creating a "bow" effect.

For example, FIG. 1 illustrates a schematic diagram of a rotor 1 experiencing the bow effect described herein. In particular, as shown, an upper portion 2 of the rotor 1 is hotter than a lower portion 3 of the rotor 1 (as indicated by the shaded gradient in the rotor 1), such that the upper portion 2 is longer than the lower portion 3. Thus, the rotor 1 is bowed or bent upwards. Such rotor bowing/deformation is undesirable and can cause damage to the gas turbine engine. As such, the present disclosure minimizes the bowing of the rotor, thus, avoiding possible rub-events between the rotor blades and casing. In addition, the present disclosure is configured to reduce the thermal damage to the gas turbine engine, thereby improving the overall life thereof.

As such, the present disclosure is directed to systems and methods for providing cooling in a compressor section of a gas turbine engine. In non-limiting examples, upon receiving an indication of the shutdown, the method is configured to activate a cooling element positioned atop a stator of the compressor section. Further, the method includes determining a differential thermal gradient of the stator based on a difference in temperature measurements between the upper half and the lower half of the stator upon shutdown. Thus, the method further includes controlling/activating at least one cooling element positioned atop the stator to reduce the differential thermal gradient so as to mitigate deformation of the rotor (e.g., rotor bowing) in the compressor section of the gas turbine engine.

Figure 2:
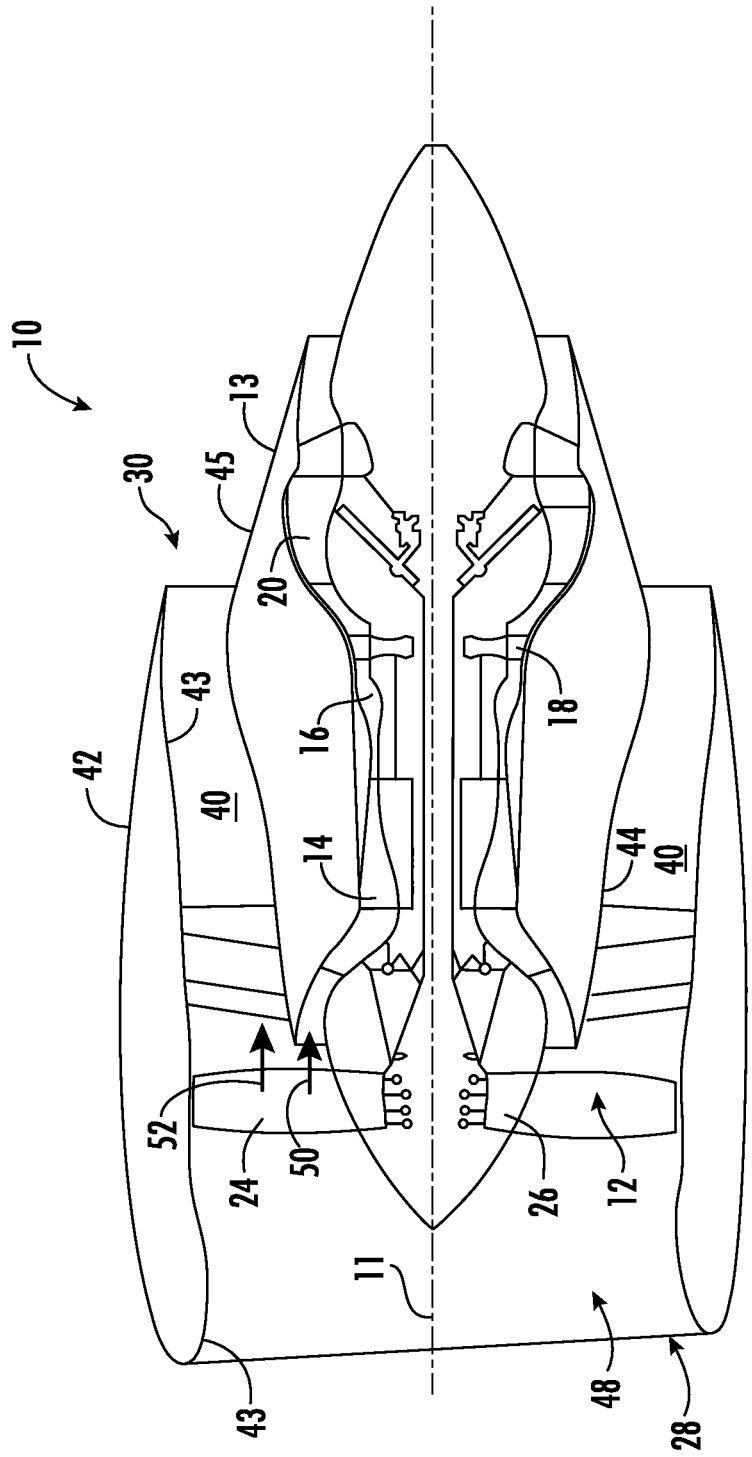
FIG. 2 is a schematic view of an exemplary gas turbine engine according to the present disclosure.

Referring now to the drawings, wherein identical numerals indicate the same elements throughout the figures, FIG. 2 is a schematic illustration of an exemplary gas turbine engine assembly 10 having a longitudinal axis 11. Gas turbine engine assembly 10 includes a fan assembly 12, and a core gas turbine engine 13. Core gas turbine engine 13 includes a high pressure compressor 14, a combustor 16, and a high pressure turbine 18. In the exemplary embodiment, gas turbine engine assembly 10 may also include a low pressure turbine 20. Fan assembly 12 includes an array of fan blades 24 extending radially outward from a rotor disk 26. Engine 10 has an intake side 28 and an exhaust side 30. Gas turbine engine assembly 10 also includes a plurality of bearing assemblies (not shown in FIG. 2) that are utilized to provide rotational and axial support to fan assembly 12, compressor 14, high pressure turbine 18 and low pressure turbine 20, for example.

In operation, an inlet airflow 48 flows through fan assembly 12 and is split by an airflow splitter 44 into a first portion 50 and a second portion 52. First portion of the airflow is channeled through compressor 14 wherein the airflow is further compressed and delivered to combustor 16. Hot products of combustion (not shown in FIG. 2) from combustor 16 are utilized to drive turbines 18 and 20 and thus produce engine thrust. Gas turbine engine assembly 10 also includes a bypass duct 40 that is utilized to bypass a second portion 52 of the airflow discharged from fan assembly 12 around core gas turbine engine 13. More specifically, bypass duct 40 extends between an inner wall 43 of a fan casing or shroud 42 and an outer wall 45 of splitter 44.

Figure 3:
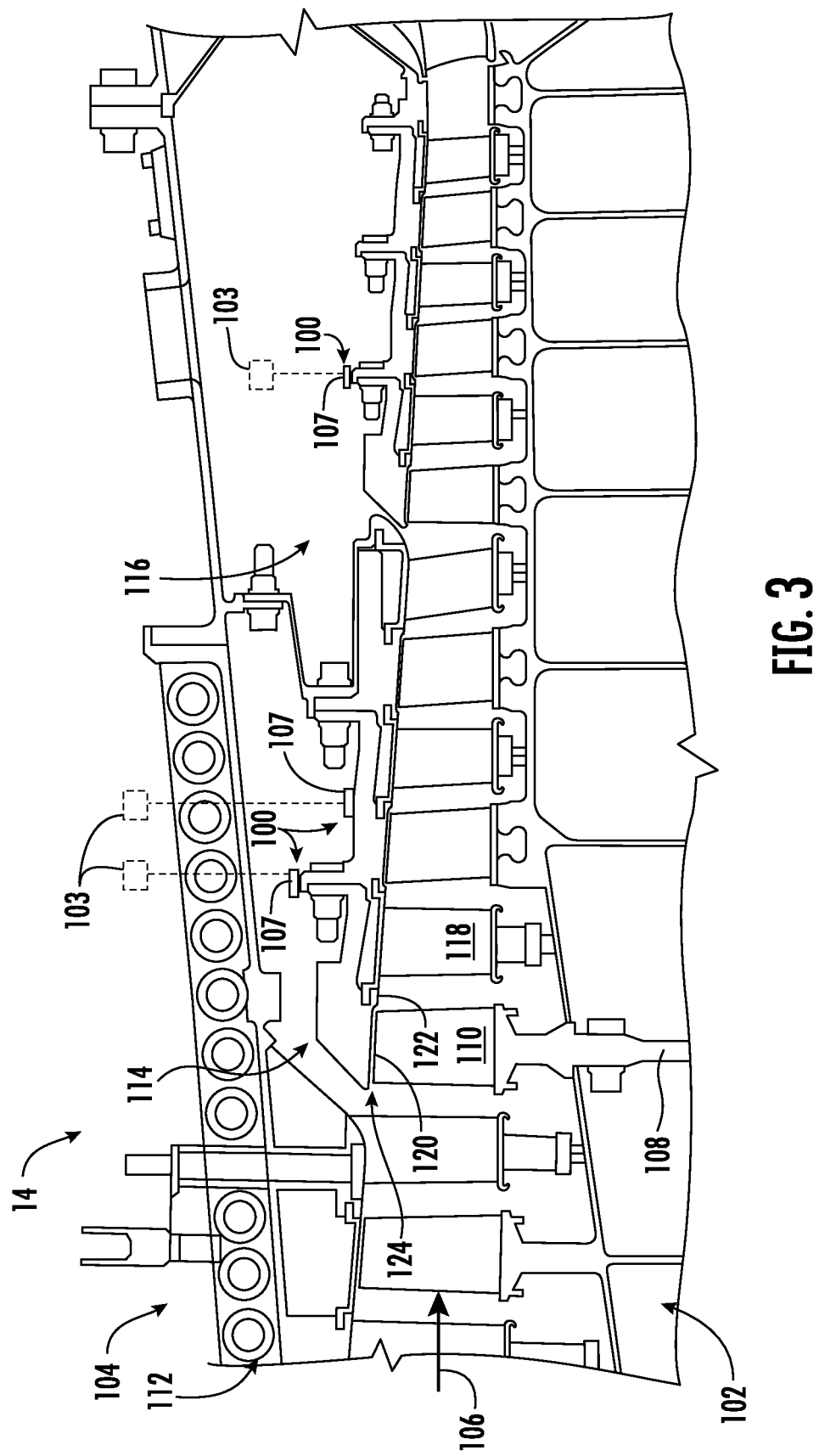
FIG. 3 is a side view of an exemplary compressor that may be used with the gas turbine engine shown in FIG. 2.
Figure 4:
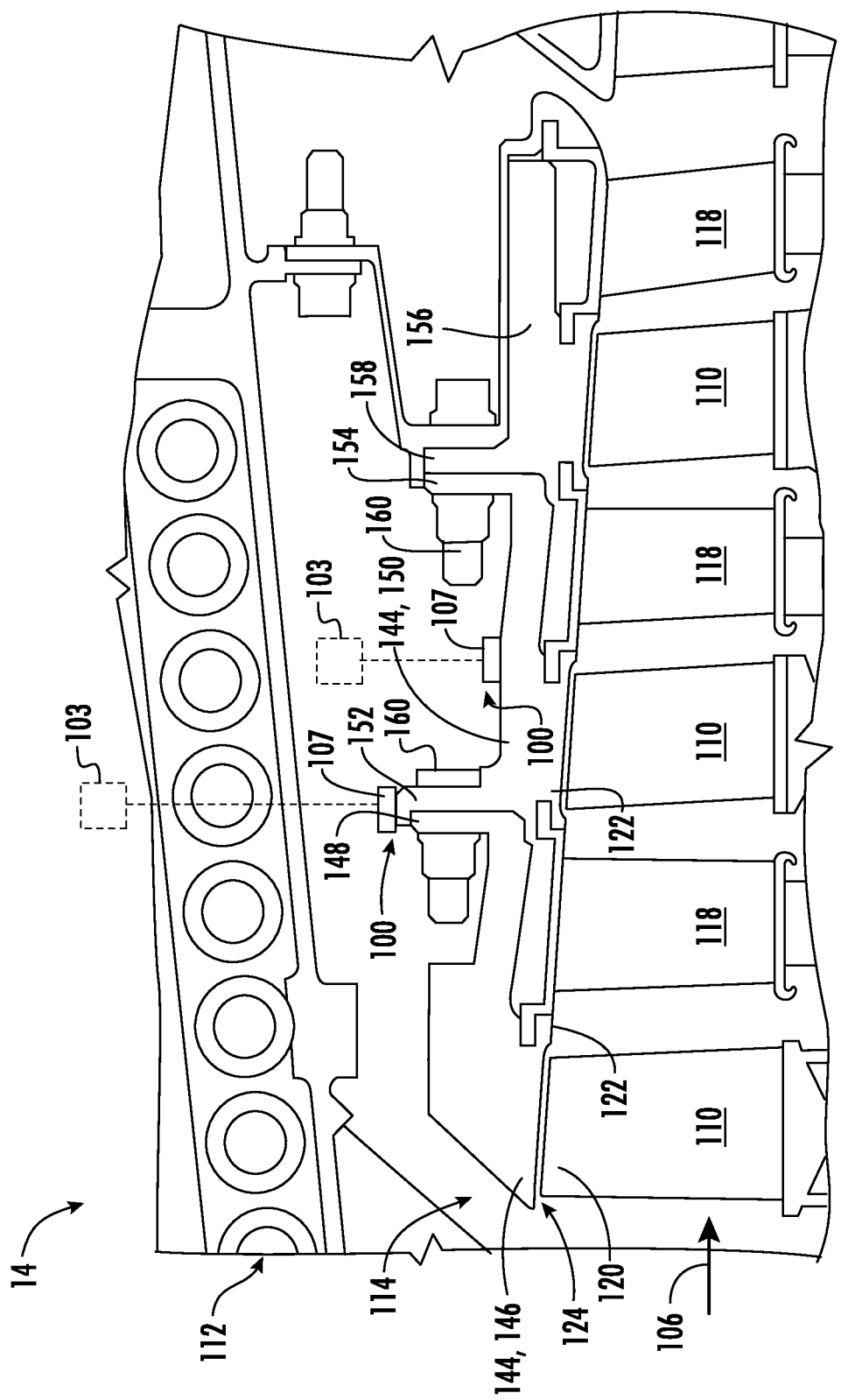
FIG. 4 is an enlarged, side view of a forward portion of an exemplary compressor that may be used with the gas turbine engine shown in FIG. 2.

Referring now to FIGS. 3 and 4, various view of an embodiment of the compressor 14 are illustrated according to the present disclosure. In particular, FIG. 3 illustrates a cross-sectional view of a portion of compressor 14 according to the present disclosure. FIG. 4 is an enlarged view of a forward portion 114 of a compressor casing 112 of the compressor 14 according to the present disclosure. In the exemplary embodiment illustrated in FIGS. 3 and 4, the compressor 14 is a high pressure compressor. Moreover, as shown, the compressor 14 includes a rotating assembly 102, such as a rotor, and a stationary assembly 104, such as a stator, that are coupled together to define a primary flowpath 106 through compressor 14. Specifically, rotating assembly 102 includes a plurality of rotor disks 108 that each include a rotor blade 110 coupled thereto. Stationary assembly 104 includes a compressor casing 112 having a forward portion 114 and an aft portion 116. Stationary assembly 104 also includes a plurality of stator vanes 118 coupled to casing 112. Compressor 14 includes a plurality of stages, and each stage includes a row of rotor blades 110 and a row of stator vanes 118. In this arrangement, primary flowpath 106 includes a plurality of interdigitated stator vanes 118 and rotor blades 110. In the exemplary embodiment, rotor blades 110 each include a tip portion 120 positioned proximate a radially inner surface 122 of casing 112 such that a gap 124 is defined therebetween.

Further, in the exemplary embodiment, as shown in FIG. 4, the forward portion 114 includes a plurality of rings 144 coupled to one another. More specifically, forward portion 114 includes a first ring 146 including an aft flange 148, a second ring 150 including a forward flange 152 and an aft flange 154, and a third ring 156 including a forward flange 158. In the exemplary embodiment, aft flange 148 of first ring 146 is coupled to forward flange 152 of adjacent second ring 150 via inserting a fastener 160 through aligned openings (not shown) defined in aft flange 148 and forward flange 152. Similarly, aft flange 154 of second ring 150 is coupled to forward flange 158 of adjacent third ring 156 via inserting a fastener 160 through aligned openings (not shown) defined in aft flange 154 and forward flange 158. Although FIG. 4 illustrates forward portion 114 as including three rings 144, forward portion 114 includes any number of rings 144 that facilitates operation of engine assembly 10 as described herein.

Referring now particularly to FIGS. 3-8, the gas turbine engine assembly 10 also includes a system 100 for providing cooling in the compressor section thereof, e.g., upon shutdown. In particular, FIG. 5A is a front view of an embodiment of a stationary assembly 104, such as the stator, of the gas turbine engine assembly 10 particularly illustrating at least one cooling element 107 arranged atop the stationary assembly 104 according to the present disclosure. Moreover, as shown in FIGS. 5A and 6A, the system 100 includes at least one first temperature sensor 103 for sensing a first temperature at a first location on the stationary assembly 104 of the compressor section. In addition, as shown in FIGS. 5A and 6A, the system 100 includes at least one second temperature sensor 105 for sensing a second temperature at a second location on the stationary assembly 104 (e.g., such as on an opposite side of the stationary assembly 104) of the compressor section. As used herein, "sensing" generally refers to measuring, estimating, determining, and/or calculating.

Figure 5A:
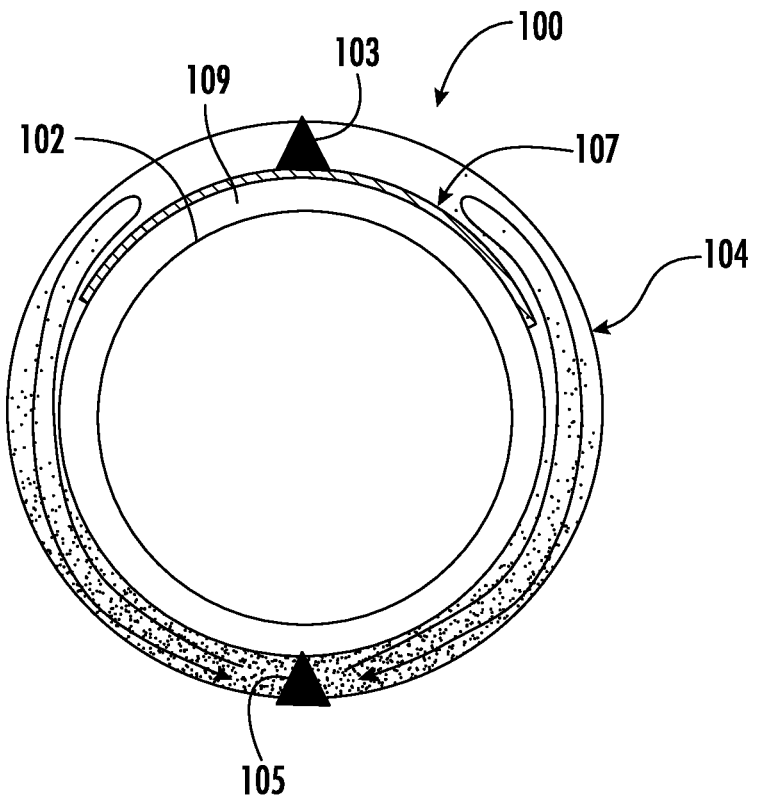
FIG. 5A is a front view of an embodiment of a stationary assembly, such as a stator, of a gas turbine engine according to the present disclosure, particularly illustrating a cooling element arranged atop the stationary assembly.

In particular, as shown in FIGS. 5A and 6A, the first location may be an upper portion of the stationary assembly 104, whereas the second location may be a lower portion of the stationary assembly 104. As used herein the upper portion of the stationary assembly 104 may be, for example, the upper half of the stationary assembly 104, whereas the lower portion of the stationary assembly 104 may be, for example, the lower half of the stationary assembly 104. Accordingly, FIGS. 3 and 4 each illustrate portions of the upper half of the stationary assembly 104. As such, it should be understood that the lower half of the stationary assembly 104 is configured in a similar manner, such that together, the upper and lower halves form the complete annular structure of the stationary assembly 104 as shown in FIG. 5A.

In further embodiments, the first and second temperature sensors may be positioned at any suitable location about the stationary assembly 104 of the compressor section. For example, in an embodiment, the first and second temperature sensors may be positioned at a twelve o'clock position and a six o'clock position, respectively. Furthermore, the first and second temperature sensors may be any suitable type of sensor now known or later developed in the art. For example, in an embodiment, the first and second temperature sensors may be thermocouples.

Moreover, as shown in FIGS. 5A and 6A, the system 100 includes at least one cooling element 107 positioned at the first location on the stationary assembly 104. For example, in an embodiment, the cooling element 107 may be a thermoelectric cooling element (such as a Peltier cooler), a cooling coil, air impingement, an active cooling element, or the like, or combinations thereof. For example, in an embodiment, the active cooling element may be a thermoelectric cooling element that generates a desired temperature differential using current and/or voltage. It should be understood that thermoelectric cooling, as described herein, generally refers to cooling methods that utilize the Peltier effect to create a heat flux at a junction of two different types of materials. Thus, in an embodiment, a Peltier cooler, heater, or thermoelectric heat pump generally refers to a solid-state active heat pump that transfers heat from one side of a device to the other, with consumption of electrical energy, depending on the direction of the current.

In further embodiments, as shown particularly in FIG. 3, the system 100 may include a plurality of cooling elements 107. In such embodiments, as shown, the plurality of cooling elements 107 may be positioned on the upper portion of the stationary assembly 104 in a serial flow arrangement along the longitudinal axis 11 of the gas turbine engine assembly 10. Thus, in an embodiment, as shown in FIGS. 3 and 4, one or more of the cooling elements 107 may be positioned on one of the rings 144 of the stationary assembly 104. Alternatively, as shown, one or more of the cooling elements 107 may be positioned at a flange location of the stationary assembly 104.

In addition, as shown in FIGS. 5A and 6A, the cooling element 107 may extend across about 90 degrees (°) to about 120° of the upper portion of the stationary assembly 104. In further embodiments, the upper portion of the stationary assembly 104 may generally extend from about 0° to about 180° of the stationary assembly 104 (e.g., from the 9 o'clock position to the 3 o'clock position). In another embodiment, the upper portion of the stationary assembly 104 may generally extend from about 30° to about 180° of the stationary assembly 104. Furthermore, as shown in FIG. 5A, the cooling element 107 may be positioned on the upper portion of the stationary assembly 104 so as to face a cavity 109 containing the rotating assembly 102.

Moreover, in an embodiment, the cooling element(s) 107 may be secured to the stationary assembly 104 using any suitable means, such as, for example, using bonding, bolting, brazing, or the like, or combinations thereof. In additional embodiments, it should be further understood that the cooling element(s) 107 may be sized depending on the size of the gas turbine engine assembly 10.

Figure 7:
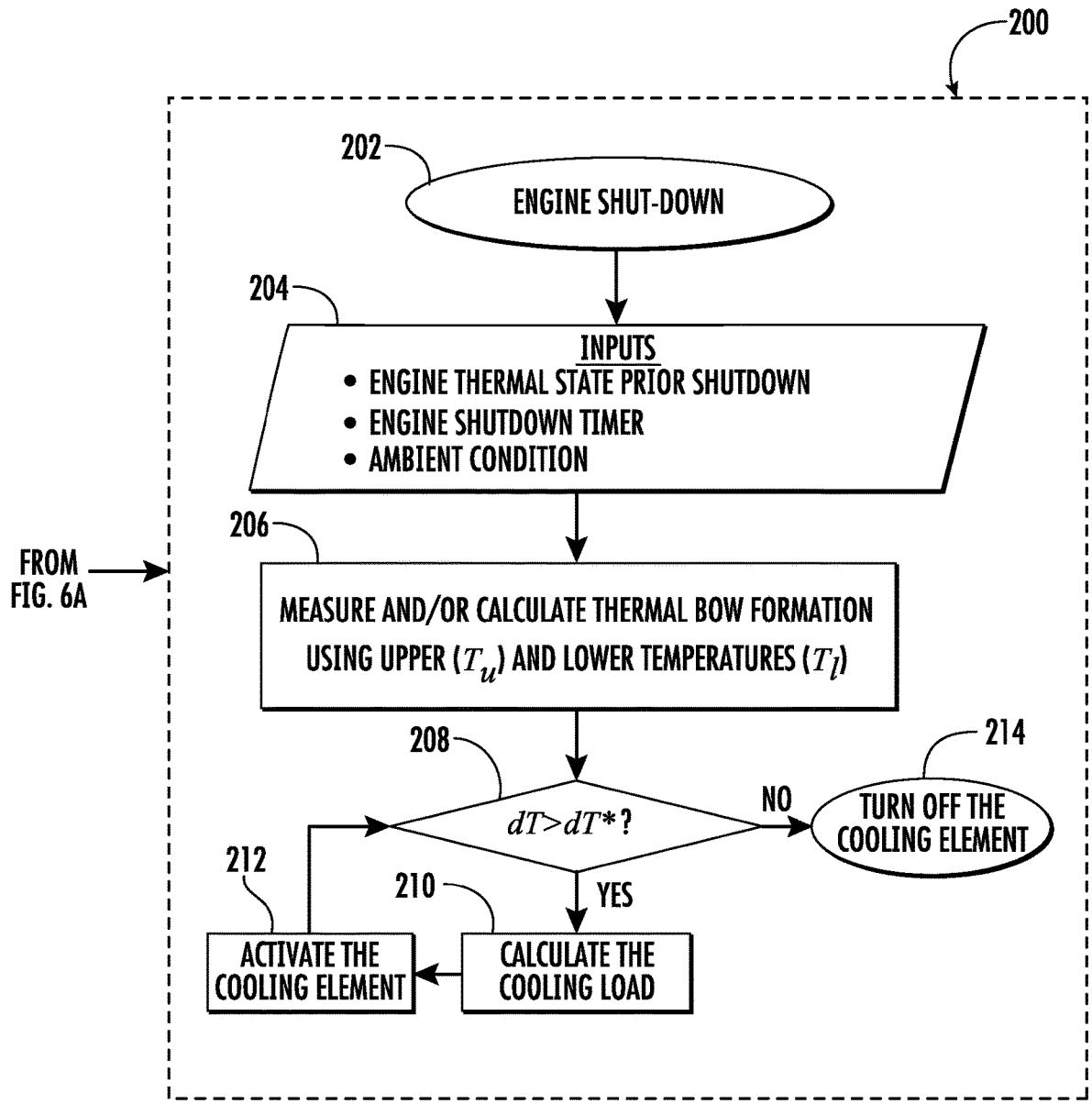
FIG. 7 is a flow chart diagram illustrating a method for providing cooling in a compressor section of a gas turbine engine upon shutdown according to the present disclosure.
Figure 8:
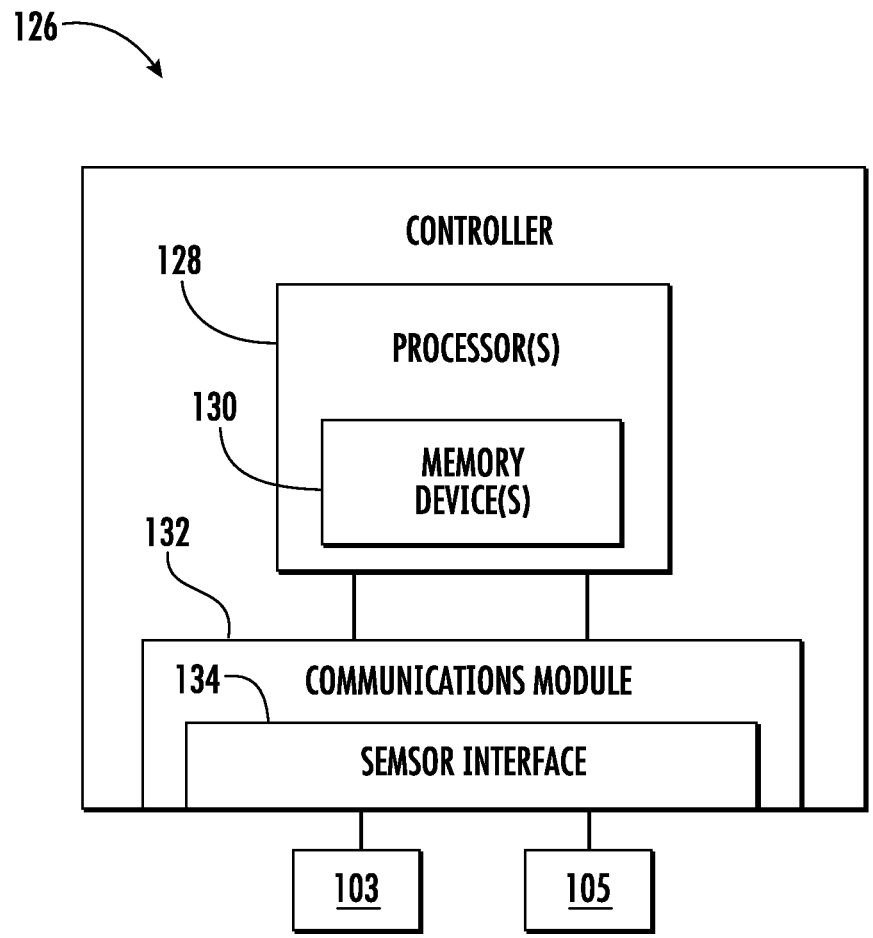
FIG. 8 is a block diagram of an embodiment of a controller of a system for providing cooling in a compressor section of a gas turbine engine upon shutdown according to the present disclosure.

Referring particularly to FIGS. 6A, 7, and 8, the system 100 also includes a controller 126 communicatively coupled to the first and second temperature sensors 103, 105 and the cooling element 107. Referring particularly to FIG. 8, a block diagram of an embodiment of suitable components that may be included within the controller 126 in accordance with example aspects of the present disclosure is illustrated. As shown, the controller 126 may include one or more processor(s) 128, computer, or other suitable processing unit and associated memory device(s) 130 that may include suitable computer-readable instructions that, when implemented, configure the controller to perform various different functions, such as receiving, transmitting and/or executing wind turbine control signals (e.g., performing the methods, steps, calculations, and the like disclosed herein).

For example, in an embodiment, the controller 126 may be configured to detect or determine a temperature using one or more suitable temperature sensors. The processor(s) 128 may include a digital signal processor (DSP), an application specific integrated circuit (ASIC), a field programmable gate array (FPGA) or other programmable logic device, discrete gate or transistor logic, discrete hardware components, or any combination thereof designed and programmed to perform or cause the performance of the functions described herein. The processor(s) 128 may also include a microprocessor, or a combination of the aforementioned devices (e.g., a combination of a DSP and a microprocessor, a plurality of microprocessors, one or more microprocessors in conjunction with a DSP core, or any other such configuration).

Furthermore, as used herein, the term "processor" refers not only to integrated circuits referred to in the art as being included in a computer, but also refers to a controller, a microcontroller, a microcomputer, a programmable logic controller (PLC), an application specific integrated circuit, and other programmable circuits. Additionally, the memory device(s) 130 may generally include memory element(s) including, but not limited to, computer readable medium (e.g., random access memory (RAM)), computer readable non-volatile medium (e.g., a flash memory), a floppy disk, a compact disc-read only memory (CD-ROM), a magneto-optical disk (MOD), a digital versatile disc (DVD) and/or other suitable memory elements. Accordingly, the memory device(s) 130 can store information accessible by processor(s), including instructions that can be executed by processor(s). For example, the instructions can be software or any set of instructions that when executed by the processor(s), cause the processor(s) to perform operations. For certain embodiments, the instructions include a software package configured to operate the system to, e.g., execute the exemplary method described herein.

Additionally, the controller 126 may also include a communications interface 132 to facilitate communications between the controller 126 and the various components of the engine 10, the temperature sensors 103, 105, and/or the cooling element 107. An interface can include one or more circuits, terminals, pins, contacts, conductors, or other components for sending and receiving control signals. Moreover, the controller 126 may include a sensor interface 134 (e.g., one or more analog-to-digital converters) to permit signals transmitted from the various sensors described herein to be converted into signals that can be understood and processed by the processor(s) 128.

Referring back to FIGS. 6A and 7, upon receiving an indication of the shutdown (e.g., from an engine shutdown sensor 142), the controller 126 is configured to activate the cooling element 107 positioned at the first location on the stationary assembly 104 of the compressor section. For example, as shown in FIG. 6A, the controller 126 may send a signal to an electric supply 136 (e.g., a power source) that provides power or current to the cooling element 107. Further, as shown, the controller 126 may also be configured to determine a differential thermal gradient 140 of the stationary assembly 104 based on a delta temperature 138 between the first and second temperatures. In particular, as shown, the differential thermal gradient 140 of the stationary assembly 104, as used herein, generally refers to a physical quantity that describes in which direction and at what rate the temperature changes the most rapidly around the stationary assembly 104.

Accordingly, as shown, the controller 126 is configured to control the cooling element 107 to reduce the differential thermal gradient 140 so as to mitigate deformation of the rotating assembly 102 of the compressor section. In such embodiments, as an example, the desired differential thermal gradient 140 may be dependent on a tendency of the rotating assembly 102 to experience bowing.

For example, in an embodiment, as shown in FIG. 7, the controller 126 is configured to implement a method 200 for providing cooling in the compressor section of the gas turbine engine assembly 10 upon shutdown. Thus, as shown at (202), the method 200 includes receiving an indication that the engine is shut down. As shown at (204), the method 200 includes receiving certain inputs, such as the engine thermal state prior to shutdown (e.g., the engine temperature), the engine shutdown timer, and/or ambient conditions. Accordingly, as shown at (206), the method 200 includes measuring and/or calculating the thermal bow formation, e.g., using a thermal model from engine testing, a look-up table, or any other suitable methods. Therefore, in an embodiment, the thermal model (or other methods) may provide a maximum and minimum temperature for the stationary assembly 104. Thus, as shown at (208), the method 200 includes comparing the delta temperature 138 (e.g., dT) to a threshold temperature (e.g., dT*), which is the temperature value below which bowing is not prominent.

Figure 5B:
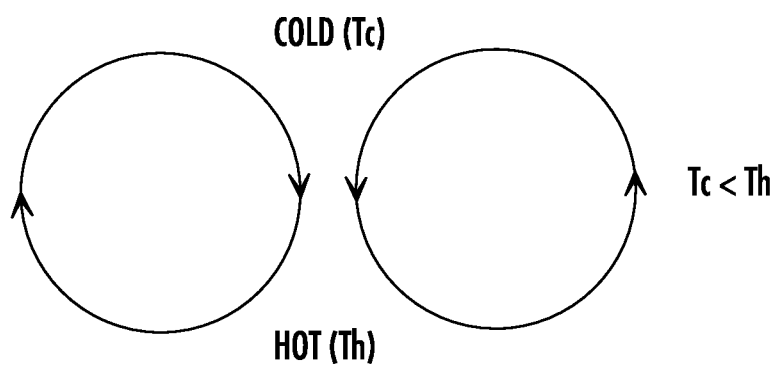
FIG. 5B is a schematic view of an embodiment of Rayleigh Bénard convection as applied to a stationary assembly, such as a stator, of a gas turbine engine according to the present disclosure.

If the delta temperature 138 is greater than the threshold temperature, as shown at (210), the method 200 includes calculating a cooling load needed to reduce the delta temperature 138 below the critical temperature. Further, as shown at (212), the method 200 includes activating the cooling element 107. In particular embodiments, for example, the method 200 may include sending a command to the cooling element 107 to cool the air at the first location on the stationary assembly 104 of the compressor section (e.g., in the vicinity of the cooling element 107). Once cooled, the air moves downward because the cool air is more dense and hot air from the lower portion of the stationary assembly 104 rises upward because the hot air is less dense. As such, the cooled air moving downward combines with the rising hot air to allow for homogenization, thereby reducing the differential thermal gradient of the stationary assembly 104. In certain embodiments, as shown in FIG. 5B, the air moving downward and the hot air from the lower portion of the stationary assembly 104 rising upward sets up Rayleigh Bénard convection.

It is contemplated that the system 100 may form a feedback loop and that the method 200 includes continuously receiving the first and second temperatures and operating the cooling element 107 accordingly. In a non-limiting example, this can include maintaining the differential thermal gradient within prescribed limits based on the first and second temperatures to mitigate deformation of the rotating assembly 102 of the compressor section.

In contrast, as shown at (214) of FIG. 7, if the delta temperature 138 is less than the critical temperature, the method 200 includes turning the cooling element 107 off or not activating the cooling element 107.

Further aspects are provided by the subject matter of the following clauses:

A method for cooling a compressor section of a gas turbine engine, the method comprising: sensing, via at least one first temperature sensor, a first temperature at a first location on a stationary assembly of the compressor section; sensing, via at least one second temperature sensor, a second temperature at a second location on the stationary assembly of the compressor section, the second location spaced apart from the first location; determining, via a controller, a delta between the first temperature and the second temperature; and operating, via the controller, at least one cooling element when the delta exceeds a predetermined threshold, the at least one cooling element provided at the first location of the stationary assembly of the compressor section.

The method of clause 1, wherein the first location is an upper portion of the stationary assembly and the second location is a lower portion of the stationary assembly.

The method of any of the preceding clauses, wherein the at least one cooling element extends between 90 degrees to 120 degrees of a periphery of the stationary assembly.

The method of any of the preceding clauses, further comprising positioning the at least one cooling element on the upper portion of the stationary assembly to face a cavity containing a rotating assembly of the compressor section.

The method of any of the preceding clauses, wherein the at least one cooling element comprises a plurality of cooling elements, the method further comprising positioning the plurality of cooling elements on the upper portion of the stationary assembly in a serial flow arrangement along a longitudinal axis of the gas turbine engine.

The method of any of the preceding clauses, wherein operating the at least one cooling element when the delta exceeds the predetermined threshold further comprises: cooling, via the at least one cooling element, air at the first location on the stationary assembly of the compressor section such that cool air moves downward due to gravity and hot air from the lower portion of the stationary assembly rises upward, wherein the cool air moving downward combines with the hot air rising upward to allow for homogenization, thereby reducing the delta between the first and second temperatures.

The method of any of the preceding clauses, wherein operating the at least one cooling element when the delta exceeds the predetermined threshold sets up Rayleigh Bénard convection.

The method of any of the preceding clauses, further comprising: repeating sensing, via the at least one first temperature sensor, the first temperature at the first location on the stationary assembly of the compressor section; repeating sensing, via at least one second temperature sensor, the second temperature at the second location on the stationary assembly of the compressor section; repeating determining, via the controller, the delta between the first temperature and the second temperature; and repeating operating, via the controller, the at least one cooling element when the delta exceeds the predetermined threshold.

The method of any of the preceding clauses, wherein repeating operating of the at least one cooling element when the delta exceeds the predetermined threshold further comprises: continuously receiving, via the controller, the first and second temperatures; and maintaining the delta between the first temperature and the second temperature within prescribed limits to mitigate deformation of a rotating assembly of the compressor section, the deformation of the rotating assembly being a bowing effect.

The method of any of the preceding clauses, further comprising positioning the at least one first and second temperature sensors at a twelve o'clock position and a six o'clock position, respectively.

The method of any of the preceding clauses, wherein the at least one first and second temperature sensors comprise thermocouples.

The method of any of the preceding clauses, wherein the at least one cooling element comprises at least one of a thermoelectric cooling element, a cooling coil, air impingement, or combinations thereof.

The method of any of the preceding clauses, further comprising: receiving an indication of a shutdown of the gas turbine engine; and upon receiving the indication, proceeding with sensing the first and second temperatures at the first and second locations on the stationary assembly of the compressor section.

A system for cooling a compressor section of a gas turbine engine, the system comprising: a first temperature sensor for sensing a first temperature at a first location on a stationary assembly of the compressor section; a second temperature sensor for sensing a second temperature at a second location on the stationary assembly of the compressor section, the second location being spaced apart from the first location; at least one cooling element positioned at the first location on the stationary assembly; and a controller communicatively coupled to the first and second temperature sensors and the at least one cooling element, the controller comprising at least one processor, the at least one processor configured to perform a plurality of operations, the plurality of operations comprising: determining a delta between the first temperature and the second temperature; and controlling the at least one cooling element when the delta exceeds a predetermined threshold.

The system of any of the preceding clauses, wherein the first location is an upper portion of the stationary assembly and the second location is a lower portion of the stationary assembly.

The system of any of the preceding clauses, wherein the at least one cooling element extends between 90 degrees to 120 degrees of a periphery of the stationary assembly.

The system of any of the preceding clauses, wherein the at least one cooling element is positioned on the upper portion of the stationary assembly to face a cavity containing a rotating assembly of the compressor section.

The system of any of the preceding clauses, wherein controlling the at least one cooling element when the delta exceeds a predetermined threshold further comprises: cooling, via the at least one cooling element, air at the first location on the stationary assembly of the compressor section such that cool air moves downward due to gravity and hot air from the lower portion of the stationary assembly rises upward, wherein the cool air moving downward combines with the hot air rising upward to allow for homogenization, thereby reducing the delta between the first and second temperatures.

The system of any of the preceding clauses, wherein the at least one first and second temperature sensors are positioned at a twelve o'clock position and a six o'clock position, respectively, and wherein the at least one first and second temperature sensors comprise thermocouples.

The system of any of the preceding clauses, wherein the at least one cooling element comprises at least one of a thermoelectric cooling element, a cooling coil, air impingement, or combinations thereof.

This written description uses examples to disclose the present disclosure, including the best mode, and also to enable any person skilled in the art to practice the disclosure, including making and using any devices or systems and performing any incorporated methods. The patentable scope of the disclosure is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

We claim:

1. A method for cooling a compressor section of a gas turbine engine, the method comprising:
    sensing, via at least one first temperature sensor, a first temperature at a first location on a stationary assembly of the compressor section;
    sensing, via at least one second temperature sensor, a second temperature at a second location on the stationary assembly of the compressor section, the second location spaced apart from the first location;
    determining, via a controller, a delta between the first temperature and the second temperature;
    operating, via the controller, at least one cooling element when the delta exceeds a predetermined threshold, the at least one cooling element provided at the first location of the stationary assembly of the compressor section;
    repeating sensing, via the at least one first temperature sensor, the first temperature at the first location on the stationary assembly of the compressor section;
    repeating sensing, via at least one second temperature sensor, the second temperature at the second location on the stationary assembly of the compressor section;
    repeating determining, via the controller, the delta between the first temperature and the second temperature; and
    repeating operating, via the controller, the at least one cooling element when the delta exceeds the predetermined threshold, wherein repeating operating of the at least one cooling element when the delta exceeds the predetermined threshold further comprises:
        continuously receiving, via the controller, the first and second temperatures; and
        maintaining the delta between the first temperature and the second temperature within prescribed limits to mitigate deformation of a rotating assembly of the compressor section, the deformation of the rotating assembly being a bowing effect.

2. The method of claim 1, wherein the first location is an upper portion of the stationary assembly and the second location is a lower portion of the stationary assembly.

3. The method of claim 2, wherein the at least one cooling element extends between 90 degrees to 120 degrees of a periphery of the stationary assembly.

4. The method of claim 2, further comprising positioning the at least one cooling element on the upper portion of the stationary assembly to face a cavity containing a rotating assembly of the compressor section.

5. The method of claim 2, wherein the at least one cooling element comprises a plurality of cooling elements, the method further comprising positioning the plurality of cooling elements on the upper portion of the stationary assembly in a serial flow arrangement along a longitudinal axis of the gas turbine engine.

6. The method of claim 2, wherein operating the at least one cooling element when the delta exceeds the predetermined threshold further comprises:
    cooling, via the at least one cooling element, air at the first location on the stationary assembly of the compressor section such that cool air moves downward due to gravity and hot air from the lower portion of the stationary assembly rises upward, wherein the cool air moving downward combines with the hot air rising upward to allow for homogenization, thereby reducing the delta between the first and second temperatures.

7. The method of claim 6, wherein operating the at least one cooling element when the delta exceeds the predetermined threshold sets up Rayleigh Bénard convection.

8. The method of claim 1, further comprising positioning the at least one first and second temperature sensors at a twelve o'clock position and a six o'clock position, respectively.

9. The method of claim 1, wherein the at least one first and second temperature sensors comprise thermocouples.

10. The method of claim 1, wherein the at least one cooling element comprises at least one of a thermoelectric cooling element, a cooling coil, air impingement, or combinations thereof.

11. The method of claim 1, further comprising:
    receiving an indication of a shutdown of the gas turbine engine; and
    upon receiving the indication, proceeding with sensing the first and second temperatures at the first and second locations on the stationary assembly of the compressor section.

12. A system for cooling a compressor section of a gas turbine engine, the system comprising:
    a first temperature sensor for sensing a first temperature at a first location defined within a compressor casing of the compressor section, wherein the first temperature sensor is mounted on a stationary assembly of the compressor section;
    a second temperature sensor for sensing a second temperature at a second location on the stationary assembly of the compressor section, wherein the second location is defined within the compressor casing, and wherein the second location is radially spaced apart from the first location;
    at least one cooling element positioned at the first location on the stationary assembly within the compressor casing; and
    a controller communicatively coupled to the first and second temperature sensors and the at least one cooling element, the controller comprising at least one processor, the at least one processor configured to perform a plurality of operations, the plurality of operations comprising:
        determining a delta between the first temperature and the second temperature; and
        controlling the at least one cooling element when the delta exceeds a predetermined threshold.

13. The system of claim 12, wherein the first location is an upper portion of the stationary assembly and the second location is a lower portion of the stationary assembly.

14. The system of claim 13, wherein the at least one cooling element extends between 90 degrees to 120 degrees of a periphery of the stationary assembly.

15. The system of claim 13, wherein the at least one cooling element is positioned on the upper portion of the stationary assembly to face a cavity containing a rotating assembly of the compressor section.

16. The system of claim 13, wherein controlling the at least one cooling element when the delta exceeds a predetermined threshold further comprises:
   cooling, via the at least one cooling element, air at the first location on the stationary assembly of the compressor section such that cool air moves downward due to gravity and hot air from the lower portion of the stationary assembly rises upward, wherein the cool air moving downward combines with the hot air rising upward to allow for homogenization, thereby reducing the delta between the first and second temperatures.

17. The system of claim 12, wherein the at least one first and second temperature sensors are positioned at a twelve o'clock position and a six o'clock position, respectively, and wherein the at least one first and second temperature sensors comprise thermocouples.

18. The system of claim 12, wherein the at least one cooling element comprises at least one of a thermoelectric cooling element, a cooling coil, air impingement, or combinations thereof.

* * * * *